United States Patent [19]

Smith et al.

[11] 4,158,501
[45] Jun. 19, 1979

[54] PROJECTION PRINTING METHOD AND APPARATUS

[75] Inventors: Edgar C. Smith, Long Island City; James B. Campbell, New York, both of N.Y.

[73] Assignee: The Three Dimensional Photography Corporation, Westchester, N.Y.

[21] Appl. No.: 864,759

[22] Filed: Dec. 27, 1977

[51] Int. Cl.² .................. G03B 35/00; G03B 27/52; G03B 27/32
[52] U.S. Cl. .................................... 355/77; 354/112; 355/40
[58] Field of Search ............... 355/125, 132, 40, 77; 354/294, 110–125

[56] References Cited

U.S. PATENT DOCUMENTS

| | | | |
|---|---|---|---|
| 2,063,985 | 12/1936 | Coffey | 354/115 |
| 2,866,397 | 12/1958 | Gillette | 355/40 X |
| 3,645,619 | 2/1972 | Burton et al. | 355/40 |
| 3,797,935 | 3/1974 | Marcy | 355/40 X |
| 3,798,782 | 3/1974 | Lindahl | 355/132 X |
| 3,844,655 | 10/1974 | Johannsmeier | 355/77 X |
| 3,895,867 | 7/1975 | Lo et al. | 354/114 X |
| 3,978,500 | 8/1976 | Brachet | 354/123 |

FOREIGN PATENT DOCUMENTS 2162566  5/1973  Fed. Rep. of Germany ............ 355/40

*Primary Examiner*—Donald A. Griffin
*Attorney, Agent, or Firm*—Jay L. Chaskin

[57] ABSTRACT

An apparatus and method of making a parallax stereogram, i.e., free vision stereogram, and particularly for the accurate registration of a plurality of film images in order to ensure stereographic reproduction. Each film frame having the image thereon includes marks which are used in a projection printing apparatus to register the image in a desired position. The registration is accomplished by mechanical alignment according to the mark or by optically sensing the mark. A comparator-servo can adjust the film frame to the desired position. After registration each film frame is exposed onto a photosensitive material using a movable line grid. A lenticular screen is superimposed over the developed picture to form the stereoscopic photograph.

45 Claims, 10 Drawing Figures

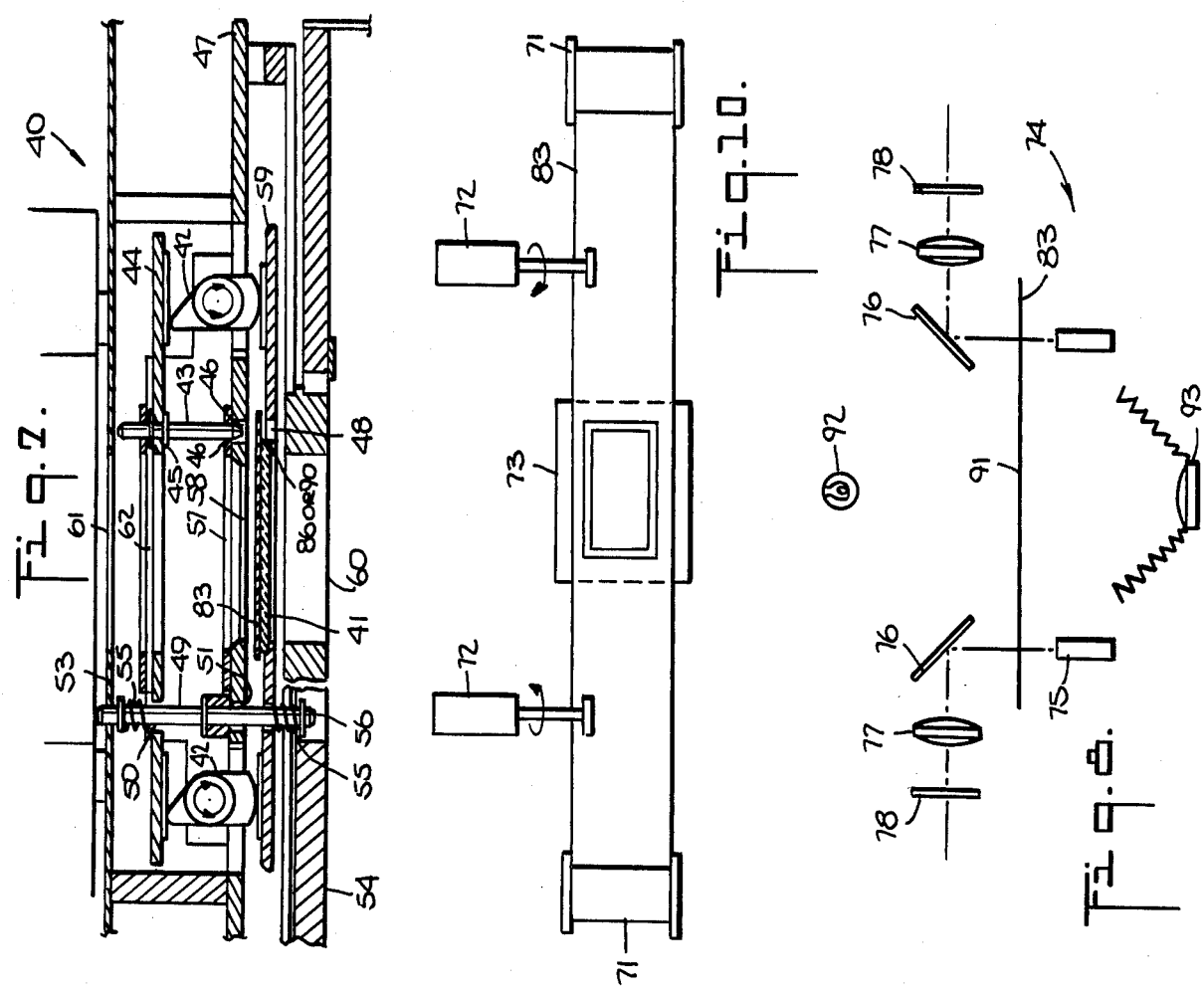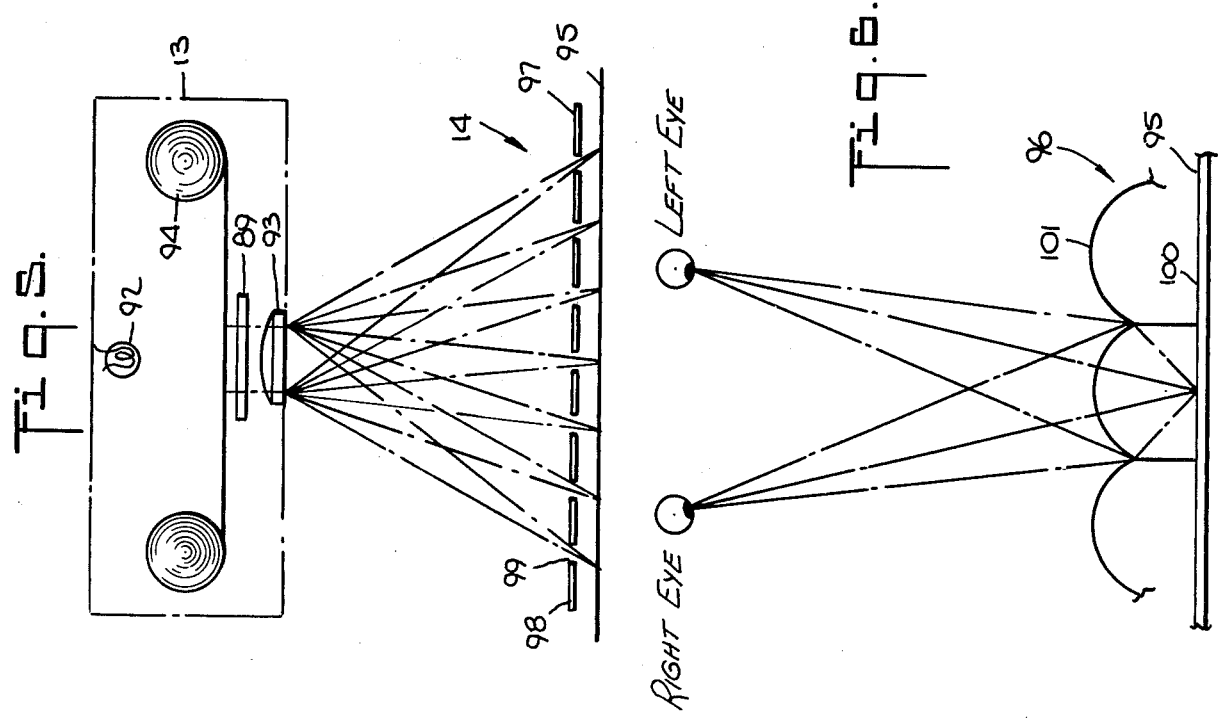

PROJECTION PRINTING METHOD AND APPARATUS

BACKGROUND OF THE INVENTION

This invention is directed to an apparatus and method for making a parallax stereogram, i.e., free vision stereogram, and particularly for the accurate registration of a plurality of film images in order to ensure stereographic reproduction. The invention is also directed to a projection printing apparatus and method for making a stereogram and enlargements of film images to be used in such stereograms.

A photographic stereogram may be prepared by several methods: (1) a photograph taken with a conventional camera having a single objective and moving it or the object to successive viewpoints; or (2) a photograph taken with a camera having a single objective and an optical stereo attachment which enables two photographs of an object to be taken simultaneously from two viewpoints; or (3) a photograph of an object with a camera having two objectives whose separation is equal to the normal stereoscopic base of approximately 65 mm. A combination of any of the foregoing methods may also be used. Each of the photographs is photographically broken up into a series of narrow strips representing alternatively the picture of the left and right stereogram.

In each of the above techniques the stereoscopic effect is directly related to the accuracy of superimposition of a plurality of images or the optical integration of a plurality of portions of an image. It is therefore seen that the registration of the images for purposes of viewing or printing is of considerable importance.

Furthermore in each of the above methods the single or multiple camera objective are directed to an aim point. The aim point is the point of convergence of the lenses in a multi-objective lens camera or the center of arc of a single lens camera which rotates around the subject or the center of rotation of the subject which rotates during the camera exposure. The aim point is a vertical line within the image that will be at the rear surface of a viewing screen when the finished picture is viewed. The aim point is therefore established and fixed before or when the photosensitive material is exposed. After exposure the aim point cannot be changed or adjusted.

In addition it is often desirable to provide an enlargement of the film image prior to printing. In a conventional photographic apparatus and method the determination of the enlargement occurs simultaneously with the establishment of the air point. In the presently known techniques for making a stereogram the degree of enlargement must be to an exact size to correspond with the pitch of the lens elements of the viewing screen.

SUMMARY OF THE INVENTION

It is an object of the present invention to provide an apparatus and method for the projection printing of a plurality of film images to make a stereogram.

It is an object of the present invention to provide an apparatus and method for changing the aim point during projection printing.

It is a further object of the present invention to provide an apparatus and method for the projection printing of a marked film strip in order to produce a stereoscopic photograph.

It is a still further object of the present invention to provide an apparatus and method for the accurate registration of a plurality of film images prior to the projection printing of a stereogram.

It is another object of the present invention to provide an apparatus and method for the enlargement of a film image without requiring such enlargement to correspond to the pitch of the lenticular elements of a viewing screen.

In accordance with the invention the method comprises the steps of providing a plurality of marked film frames having images of the same subject; registering a first film image according to the mark on the first film frame; optically projecting the registered first film image onto a line grid having alternating opaque and transparent portions superimposed over photosensitive printing paper; registering a second film image according to the mark on the second film frame; optically projecting the registered second film image onto the paper after causing an incremental relative movement between the line grid and the paper; sequentially registering each subsequent film frame and optically projecting each image onto the paper for each incremental relative movement between the line grid and the paper; and superimposing a viewing screen over the subsequently developed paper. The plurality of film images may be in a continuous strip form. Each film frame may be registered mechanically or by optical sensing. The marks may be caused by the removal of a portion from each film frame or by causing an optical density differential. If the marks are apertures in the film frame, registration is provided by pins extending through the apertures. Alternatively by optical sensing the mark a signal can be produced for each mark. The signals are compared and the film frame position is adjusted until the signals are substantially equal. The optical sensing can be by scanning the mark or by projecting an optical source and determining the source in relation to the mark.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

FIG. 5 is a partial schematic of the projection printing apparatus comprising the enlarger and line grid for the printing of the film image;

FIG. 6 is a partial schematic of the assembled stereoscopic photograph showing the lenticular viewing screen;

FIG. 7 is a partial cross-sectional view of a mechanical means for registering the film frame;

FIG. 8 is a partial schematic of an optical sensing means for registering the film frame;

FIG. 10 is a partial schematic of the relationship between the servo system and the film frame.

DETAILED DESCRIPTION OF THE INVENTION

Commonly assigned copending application Ser. No. 864,748, the entire contents of which are hereby incorporated by reference, discloses an apparatus and method for producing a parallax stereogram. The apparatus comprises a stable means for supporting a carriage assembly means, the carriage assembly means being movable on the stable means and supporting the film image frames. Optical means on the stable means permits the optical viewing of at least two image frames. A mark is placed on each of the plurality of frames as the carriage assembly is moved. The optical viewing establishes homologous points for each film frame image or is used to establish a stereo base distance to determine the homologous points. As used herein "homologous points" is defined as the two point images in a stereo pair which correspond exactly. The carriage assembly means is moved by a programmed mechanical stepping or electromechanical means so as to allow a plurality of marks to be placed on each film frame sequentially. The marks, to be used to register each film image, are caused by the removal of a portion from each film frame or by causing an optical density differential. The mark can be effected mechanically, as by a punch, or optically, as by a focused laser. The laser or other narrow beam of radiation, removed or adds density to a portion of the emulsion layer for each film frame. The markings on each film frame can be arranged in a different size, orientation or shape relative to the image on the frame or to each other. The marks permit the recognition of the correct or desired position or registration for each film frame by a mechanical or optical sensing means during the printing of each image. A projecting printing apparatus comprising an enlarger and a line grid uses the marked film frame to expose photosensitive paper and print the film image. A viewing means, such as a lenticular screen, is affixed to the print to form the stereogram. In commonly assigned copending application Ser. No. 864,747, the entire contents of which are hereby incorporated, there is disclosed a multi-objective camera for providing the plurality of film frame images preferably in a continuous film strip.

Figure 1:
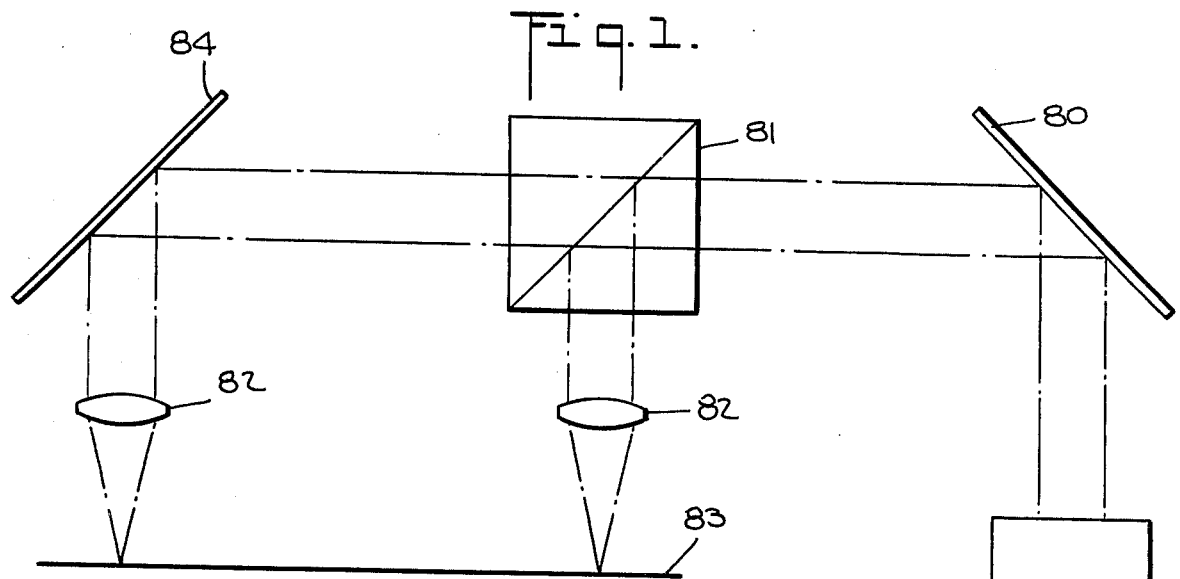
FIG. 1 is a schematic of an optical means for generating the frame registration marks.
Figure 2:
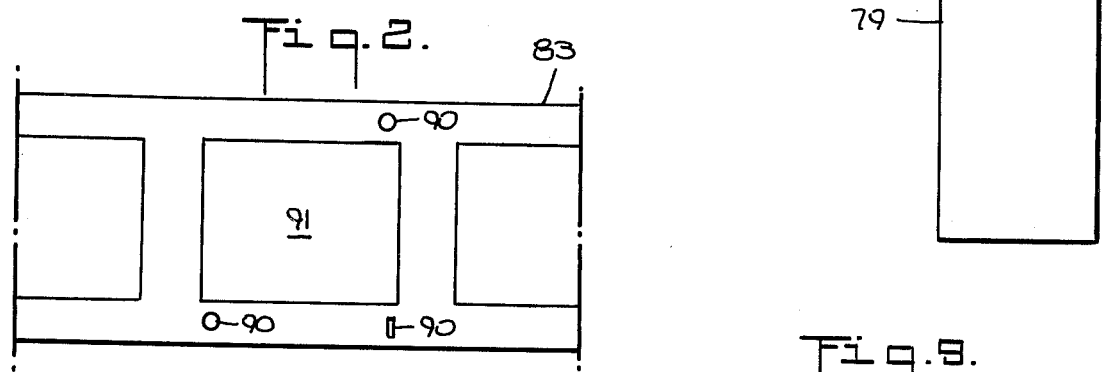
FIGS. 2, 3 and 4 are partial schematics of a film frame showing several embodiments of the registration marks.
Figure 4:
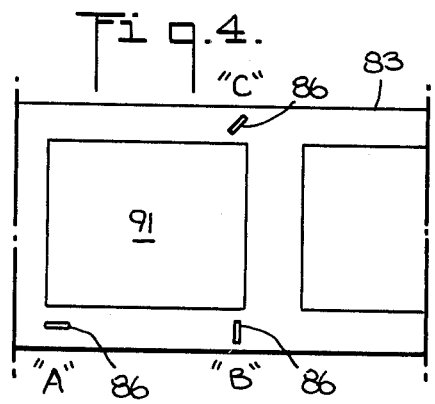
Figure 3:
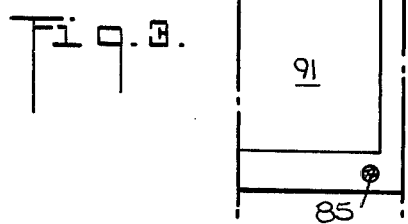

Referring to FIG. 1 the optical beam of a laser 79 preferably having a wavelength of 0.7 to 0.3 microns, is reflected from a mirror 80 to a beam splitter 81. Beam splitter 81 divides the optical beam into two beams which are directed onto the film 83 through lenses 82. One of the two divided beams is directed onto the film 83 by a mirror 84. The laser removes a selected portion of the emulsion layer from the film frame or adds to the optical density of a portion of the emulsion layer or may cause a removal of the film and provide an aperture. The markings on the film 83 whether optically or mechanically formed are representatively shown in FIG. 2 to 4. The markings may be arranged in a different orientation, size, shape or location relative to the image on the frame or to each other. The orientation, size, shape or location differentiation permits the recognition of the correct registration for each film frame 91 by a mechanical means or optical sensor during the printing step of each image. In FIG. 1 there is disclosed dividing the optical beam into two beams. It is understood that the number of optical beams can be varied as necessary to ensure proper registration. In a similar manner the number of mechanical punches may vary. In FIG. 2 to 4 the marks are shown as being circular and rectangular. The shape of the mark is not critical and other shapes are possible. By way of example the laser optical beam or the mechanical punch may be shaped to provide any regular or irregular polygonal configuration. In FIG. 2 two of the three marks 90 are of the same shape but are in diagonally opposite locations with respect to the film image 91. In FIG. 3 two similarly shaped marks 85 are shown, each mark located adjacent opposing sides of the film image and adjacent a side common to the opposing sides. In FIG. 4 the three marks 86 are each of the same shape but are in a different orientation relative to the film image 91. It is understood that the location of the marks relative to each other or to the film image or the location of the marks on the film image is not critical. In FIG. 3, for example, the narrow well-defined laser optical beam has caused a change in the optical beam has caused a change in the optical density of the film 83 adjacent to the film image 91 and produced marks 85. In FIGS. 2 and 4, for example, the laser optical beam has provided in the film 83 adjacent to the film image 91 a plurality of apertured marks 90 and 86, respectively.

FIG. 5 schematically shows the overall projecting printing apparatus. Enlarger 13 includes an optical repeating 92 which projects through lens 93 a selected image frame from the film 83. The film 83 is stored in a cassette 94 which has been removed from the camera and processed. Located between the film 83 and the lens 93 is registration means 89 which positions the selected film image prior to projection and printing. The film image 91 is projected towards a line grid 14. The line grid 14 comprises a movable line grid 97 which is divided into a plurality of opaque 98 and transparent 99 sections extending across the width of the grid in a repeated pattern. The basic repeating pattern has a width equal to the width of the base 100 of each lens 101 on the lenticular screen 96, as shown in FIG. 6. The width of the transparent portion 99 of each basic repeating pattern is determined by dividing the total width of the repeating pattern by the number of image frames to be projected and printed. Stated in another manner the width of the transparent portion 99 of each basic repeating pattern is equal to the number of camera lenses, i.e., the number of simultaneously taken film frames, divided into the total width. For example, if there are seven lenses and the total width of the basic repeating pattern is 0.021 inches, then the width of the transparent portion 99 is 0.003 inches and the opaque portion is 0.018 inches. The total number of the basic repeating pattern is equal to the total number of parallel lenses 101 on the lenticular viewing screen 96 of the final product. The line grid 97 is located between the enlarger 13 and the print paper 95.

In processing, each frame is printed onto the paper 95 and simultaneously across the entire grid 97 for the width of each of the transparent portions 99 of the repeating pattern. When the film 83 is a continuous strip, the film is advanced by one frame and the grid 97 is moved in the same direction in 0.003 inch increments so as to print simultaneously across the paper 95 each successive frame. Each of the image frames 91, for example, seven, is printed sequentially but for each lens 101 of the lenticular viewing screen 96. At the completion of the processing in the line grid 97 the paper 95 has a plurality of prints across the paper equal in number to the number of the lenses 101 on the lenticular viewing screen 96, the width of each print being equal to the base 100 of each lens of the viewing screen and each print comprising each of the film images 91.

The print paper 95 is then processed to produce the photographed subject. The lenticular viewing screen 96 is placed over the picture so as to align each lens base 100 with a respective one of the now-developed repeating pattern, and laminated into a fixed position.

As used herein "paper" refers to the use of any photosensitive material either positive or negative. Any commercially availabe photosensitive film can be used to provide the plurality of images. Preferably the film should be dimensionally stable and an Estar based film is especially desirable if the marking is accomplished mechanically. Preferably the film images are formed on a continuous film strip. The method of the present invention can also be practiced using a plurality of separate film images provided from a plurality of cameras or from a plurality of camera positions.

The optical and physiological principles associated with viewing the assembled parallax stereogram, as shown in FIG. 6, are well-known. The viewing of a parallax stereogram is described in U.S. Pat. No. 3,482,913 and 3,504,059 and 3,508,920, in the name of W. E. Glenn, Jr.; and in U.S. Pat. No. 3,678,833 in the name of S. L. Leach. A suitable technique for registering and laminating the lenticular screen 96 and the print 95 is disclosed in U.S. Pat. No. 3,462,226 in the name of J. E. Huffaker. The entire description and disclosures of each of these U.S. patents is incorporated by reference to this application.

Figure 9:
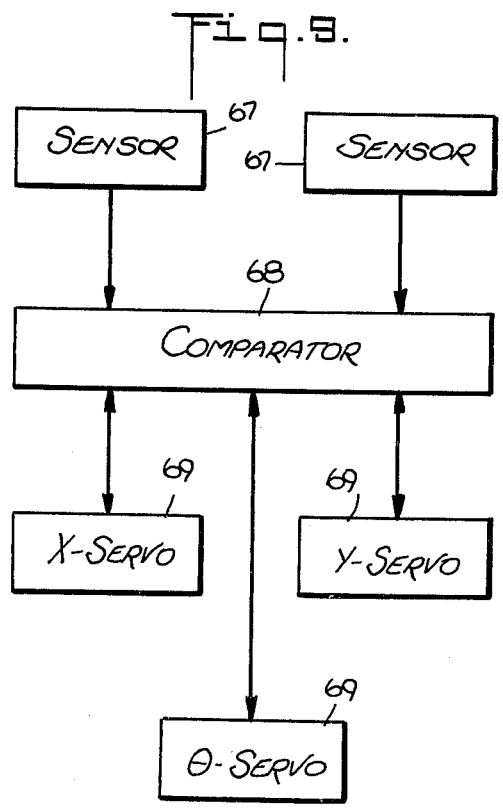
FIG. 9 is a block diagram showing the servo system for adjusting the film frame position.

FIGS. 7 to 9 disclose several embodiments of means 89 for registering a selected film image of the film frame in the projecting printing apparatus. In FIG. 7 a mechanical registration means 40 is shown comprising cam actuated pins which extend through the registration aperture marks 86 or 90 on the film 83. FIG. 7, a schematic cross-sectional view, shows the film 83 disposed on a transparent member 41. The transparent member 41 is mounted in a support 59 of an intermediate frame portion 47. Located over the film 83 is the registration means 40 comprising cams 42 and pins 53. As shown in FIG. 7 the rotation of cams raise and lower a pin plate 44. The pin 43 is secured to the pin plate 44 by nut means 45. The pin 43 extends through an opening 46 in intermediate frame portion 47, the aperture 86 or 90 and an opening 48 in support 59. The intermediate frame portion 47 has openings 57, 58 to permit the projection of the film image. In FIG. 7 the pin plate is shown in the raised position so as to disengage the pin from the film frame. Only one pin is shown it being understood that there may be more than one pin and the number of pins may be equal to the number of aperture registration marks on the film frame. As noted earlier, the cross-sectional shape of the pins may be complimentary to the shape of the aperture marks. A noted earlier, the number, shape, location orientation and size of the aperture marks may be formed by a suitably shaped and directed mechanical punch or optical beam. A guide pin 49 extends through an opening 50 in the pin plate 44, an opening 51 in intermediate frame 47 and an opening 52 in the support 59. The guide pin 49 is supported between an upper frame portion 53 of the registration means 40 and a lower frame portion 54 by springs 55 and a nut 56 threaded onto one end of the pin. It is understood that there may be more than one guide pin. The lower frame portion 54 has an opening 60 and the upper frame portion 53 has openings 61, 62 to permit the projection of the film image. During the raising and lowering of the pin the guide pin provides means for preventing the misalignment of the pin with the registration aperture and reduces the possibility of damaging the film. In operation a first film frame is disposed on the transparent member and the cams are rotated allowing the pin to be lowered and extend through the registration aperture. After extending through the aperture the film frame position may be maintained by a clamp means. The optical source 92 causes the film image to be projected through lens 93 onto the line grid 14. The film image is projected through transparent portions 99 of line grid 97 onto photosensitive paper 95. A second film frame is then disposed on the transparent member and registered with the pins extending through the aperture. An incremental relative movement between the line grid 97 and paper 95 is provided preferably by the movement of the line grid 97. The magnitude of the incremental relative movement is equal to the width of the transparent portion 99. As noted earlier, the width of the transparent portion 99 is determined by the total width of the repeating pattern and the number of film images to be projected. The optical source 92 causes the second film image to be projected through the lens 93 onto the line grid 14. The second film image is projected through transparent portions 99 of line grid 97 onto photosensitive paper 95. Third and subsequent film frames are disposed on the transparent support and registered. An incremental relative movement between the line grid and the paper is provided and each film image is projected onto the paper. The number of film images is determined by the number of effective objective lenses on the camera or the number of film images of the same subject which are to be used to form the stereogram. Where the plurality of film images are in the form of a continuous film strip, such as in a cassette 94, the incremental relative movement should be in the same direction to that of the advance of the film strip through the projection printing apparatus. A continuous film strip is shown in FIG. 10 extending between film spindles 71. Film motor means 72 permits the advance or reverse of the film strip relative to the registration support.

FIG. 8 schematically shows an optical registration means 74. A plurality of solid state optical sources 75, such as light emitting diodes, each project a beam of radiation onto the film frame 91. The beam is projected onto the film frame 91 in the vicinity of the registration marks. After passing through the film frame 91 the beam is reflected by mirror 76 onto a lens 77 which projects the beam to a multi-element optical sensor 78. The intensity of the beam received at sensor 78 is determined by the relative position between the registration marks and the radiation from the optical source. As noted earlier, the registration mark can be an aperture in the film which will not attenuate the intensity of the beam as compared to the film itself. Alternatively the registration mark can reduce the intensity of the beam relative to the film itself where the mark has a greater optical density. The desired position of the image frame can be achieved by adjusting the relative position of the image to the beam so as to cause the output of each sensor to be substantially equal. The film frame can be part of a continuous strip and can use the apparatus of FIG. 10. In operation the optical registration means of FIG. 8 is the same as that of the mechanical registration means of FIG. 7.

In another embodiment of the optical registration means the film frame can be scanned to determine the location of the registration marks. A well-defined focused scanning radiation source is projected onto the moving film strip in the vicinity of the registration marks. The radiation source can be sinusoidally scanned at 500 Hz. Referring for example to FIG. 4, an optical sensor for registration mark "A" will sense the mark A for a longer period of time than the optical sensors for marks B and C. For example, consider the marks "A", "B" and "C" as a rectangular shape having a length of 0.100 inches and a width of 0.010 inches. In the film advance or rewind direction (X-direction), at a film speed of one inch/second, the A sensor can "see" the A registration mark for 0.1 seconds. At the 500 Hz scanning rate the signal to the A sensor would persist for 100 successive scan half-cycles. The orientation in the X-direction of the B and C registration marks relative to the film image, however, causes the signal from the sensors for each of these marks to persist for a considerably lesser amount of time, e.g., 10 successive scan half-cycles. Thus, sensor logic can determine the simultaneous occurrence of (a) 30 successive A sensor signals at the appropriate intersignal period of 0.001 seconds and (b) 500 Hz signals present from the B and C sensors. When this condition is detected the motor causing the film travel can be braked and stopped. The stationary film image can be fixed in position on a film support table 73 by a clamping means. Sensor logic, as in FIG. 9, can then actuate a servo fine motion system for the table and position the film image. The servo system has sensors 67 for each of the marks, such as marks "A", "B" and "C", which can responsively position the table in the X, Y and $\theta$ directions until the sensor signals are substantially equal. The X-direction is the wind or rewind direction; the Y-direction is transverse to the X-direction; and the $\theta$ direction is the angular rotation of the film image. The output of each sensor 67 is the input to a comparator 68. The output of the comparator 68 actuates respective X, Y and $\theta$ direction servos 69 which positions the film image 91, for example, on support 73. When the signals are substantially equal the film image can be projected onto the line grid 14.

The sensor logic of FIG. 9 can also be used with the optical sensing embodiment described in FIG. 8. In addition, instead of the radiation source the optical sensor can do the scanning.

In the registration means described herein the tolerance for overall alignment of any film image should not exceed a circle of one mil diameter. Stated in another manner any representative small common feature of each of the film images for a particular stereogram should be brought, in the projection printing apparatus, to within 0.5 mil of an "average" point. The solid state optical source of FIG. 8 on the scanning radiation source is preferably in the blue wavelength to take advantage of the greater optical density of the film at that wavelength. The film may be an Eastman Kodak, 70 mm, Varicolor II, 2107 Type S, photographic film or any equivalent thereof. The film may be of any size or type so as to be compatible with the apparatus or user requirements or vice versa.

In copending application Ser. No. 864,748 and Ser. No. 864,747 there is disclosed an apparatus and method for establishing the aim point after the photographic film has been exposed with a given subject. Application Ser. No. 864,748 discloses an apparatus for establishing the plurality of corresponding aim points for the plurality of film images or the stereo base distance established by those points. During the projection printing according to this application an operator or person viewing the print may decide that the picture would be more pleasing or aesthetically improved if the aim point was moved forward or backward from that which was previously established. The aim point can be adjusted by moving the enlarger lens 93 in small predetermined horizontal increments to displace the projected film image more or less than the stereo base distance. Alternatively the aim point can be adjusted by the incremental horizontal movement of the line grid 14, i.e., the line grid 97 and paper 95 move together. In either technique only the projected film image is displaced as the film frame remains fixed on the registration means. Displacement of the projected image so as to change the aim point, viz., stereo base distance, permits any degree of enlargement of the entire film image. Similarly such a displacement of the projected film image permits the enlargement and/or stereographic reproduction of any corresponding portions of the film images. The enlargement according to this invention does not have to be to an an exact size to match the screen pitch of the lenticular screen 96.

Furthermore, as disclosed above the incremental movement between the film direction and the line grid is such that the grid is moved in the same direction as the film while the paper is stationary. Alternatively the grid may be stationary and the incremental relative movement provided by moving the paper in the direction opposite to that of the film.

Various modifications and improvements may be made by one skilled in the art to the method and apparatus disclosed herein without departing from the copy of the invention as defined by the claims.

1. A method of processing film images for making a stereogram comprising the steps or providing a plurality of film frame images of the same subject, each frame being marked to identify homologous points for the images to establish an aim point for each image,
   providing a line grid having alternating opaque and transparent portions of a defined width superimposed over photosensitive printing paper;
   using the mark to optically project a first film image so as to place the aim point at a given location on the printing paper and expose on the paper a first portion of the first film image equal to the width of the transparent portion of the line grid while maintaining the line grid stationary;
   using the mark to optically project a second film image so as to place the aim point at the given location and expose on the paper a second portion of the second film image equal to the width of the transparent portion of the line grid while maintaining the line grid stationary after causing a linear incremental relative movement between the line grid and the paper;
   repeating sequentially the last mentioned step foe each remaining film frame image.

2. A method according to claim 1 wherein the plurality of film images is a continuous strip and wherein the incremental movement of the line grid is in the same direction as the movement of the strip.

3. A method according to claim 1 wherein the mark is is registered mechanically during optical projection.

4. A method according to claim 3 wherein the mark comprises a plurality of apertures and the registration step comprises aligning the apertures with registration pins and extending the pins through the apertures.

5. A method according to claim 1 comprising the step of superimposing a viewing screen over the subsequently developed printing paper.

6. A product according to the method of claim 5.

7. A product according to the method of claim 3.

8. A method according to claim 1 wherein the film frame is registered optically during optical projection.

9. A product according to the method of claim 8.

10. A method according to claim 1 wherein the film frame has a plurality of marks, sensing the marks to produce a signal for each mark, and
adjusting the film frame position until the signals are substantially equal before projecting the image.

11. A method according to claim 10 wherein the sensing comprises optically scanning the marks to produce the sensed signal.

12. A method according to claim 10 wherein the sensing comprises generating an optical source, and sensing the optical source in relation to each mark.

13. A method according to claim 1 wherein the film frame has a plurality of marks and sensing the markings to produce a signal for each mark, the sensing provided by a scanning optical source.

14. A method according to claim 1 wherein the film frame has a plurality of marks and sensing the markings to produce a signal for each mark, the sensing provided by a scanning optical sensor.

15. A method according to claim 1 wherein the plurality of film images is a continuous strip and wherein the incremental relative movement of the paper is in a direction opposite to the movement of the strip.

16. A method according to claim 1 wherein the marked film comprises
a selected pair of film frames marked to identify the homologous points and
the remaining film frames are marked to identify in each film frame a point which is the same point as identified in the selected pair.

17. A product according to the method of claim 16.

18. A method according to claim 16 comprising the step of superimposing a viewing screen over the subsequently developed printing paper.

19. A product according to the method of claim 18.

20. A method according to claim 1 comprising the step of adjusting the aim point by moving the optical projection of the film frame mark in horizontal increments.

21. A product according to the method of claim 20.

22. A method according to claim 20 comprising the step of superimposing a viewing screen over the subsequently developed printing paper.

23. A product according to the method of claim 22.

24. A method according to claim 1 comprising the step of adjusting the aim point by moving the line grid and paper together in horizontal increments.

25. A product according to the method of claim 24.

26. A method according to claim 24 comprising the step of superimposing a viewing screen over the subsequently developed printing paper.

27. A product according to the method of claim 26.

28. A product according to the method of claim 1.

29. A projection printing apparatus for making a stereogram comprising
means for supporting a plurality of film frame images of the same subject, each film frame having a mark thereon to identify a corresponding homologous point in each film frame image to establish an aim point;
means for registering the film frame image in a desired position according to the mark;
a line grid means disposed between the film frame image and photosensitive paper, the line grid having a repeating pattern of alternating opaque and transparent portions, the transparent portions being of a given width;
means for optically projecting the film frame image through the line grid means onto the photosensitive paper so as to place the aim point at a given location on the paper and expose on the paper a portion of the film frame image equal to the given width of the transparent portions; and
means for causing a linear incremental relative movement between the line grid mens and the paper.

30. An apparatus according to claim 29 wherein the registration means comprises mechanical means which engage the film frame mark.

31. An apparatus according to claim 30 wherein the mark comprises an aperture in the film frame and the mechanical means comprise a pin which extends through the aperture.

32. An apparatus according to claim 29 wherein the registration means comprises means for sensing the film frame to determine the mark on the film frame and produce a signal for each mark; and
means for determining when the signals are substantially equal.

33. An apparatus according to claim 32 wherein the sensing means comprises optical sensors.

34. An apparatus according to claim 32 wherein the registration means includes means responsive to the signals to adjust the film image to the desired position.

35. An apparatus according to claim 32 wherein the sensing means comprises for each mark a solid state optical source and a multi-element optical sensor.

36. An apparatus according to claim 29 wherein the incremental movement means causes the line grid to move relative to the paper.

37. An apparatus according to claim 29 comprising a plurality of film frames forming a continuous film strip and wherein the incremental movement is in the same direction as the movement of the strip during registration of each film image.

38. An apparatus according to claim 29 wherein the film frame has a plurality of marks.

39. An apparatus according to claim 38 wherein each of the mark has a different relative orientation to the film image.

40. An apparatus according to claim 29 wherein the line grid transparent portion has a width determined by dividing the total width of the repeating pattern by the film frame plurality.

41. An apparatus according to claim 29 wherein the registration means comprises means for sensing the film frame to determine the mark on the film frame and produce a signal for each mark, wherein the sensing means comprises an optical source scanning each mark and optically sensitive output means for each mark.

42. An apparatus according to claim 29 wherein the registration means comprises means for sensing the film frame to determine the mark on the film frame and produce a signal for each mark, wherein the sensing means comprises an optical source for each mark and an optically sensitive output means scanning each mark.

43. An apparatus according to claim 29 wherein the plurality of film images is a continuous strip and wherein the incremental relative movement of the paper is in a direction opposite to the movement of the strip.

44. A projection printing apparatus according to claim 29 wherein the optical projection means is movable in horizontal increments.

45. A projection printing apparatus according to claim 29 wherein the line grid and paper are movable together in horizontal increments.

* * * * *